P. E. NORRIS.
TERMINAL STRUCTURE FOR ELECTRIC BATTERIES.
APPLICATION FILED FEB. 18, 1920.
1,386,946.
Patented Aug. 9, 1921.
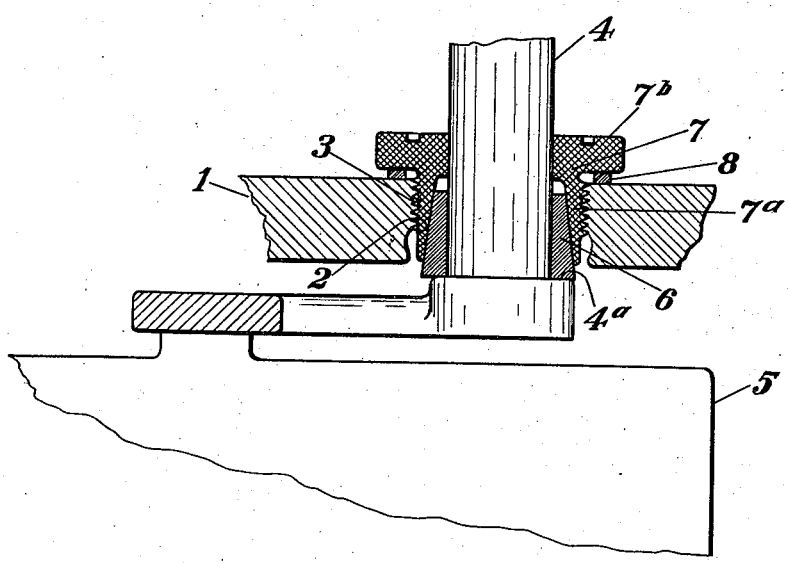
INVENTOR,
Paul E. Norris,
BY
HIS ATTORNEY.

UNITED STATES PATENT OFFICE.

PAUL E. NORRIS, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

TERMINAL STRUCTURE FOR ELECTRIC BATTERIES.

1,386,946.   Specification of Letters Patent.   Patented Aug. 9, 1921.

Application filed February 18, 1920. Serial No. 359,532.

*To all whom it may concern:*

Be it known that I, PAUL E. NORRIS, a citizen of the United States, residing at Pittsburgh, in the county of Allegheny and State of Pennsylvania, have invented certain new and useful Improvements in Terminal Structures for Electric Batteries, of which the following is a specification.

My invention relates to electric batteries, and particularly to terminal structures for such batteries. The invention is particularly adapted for use in storage batteries, although it is not limited to batteries of this class.

One object of my invention is the provision of a terminal structure which is effective to prevent leakage of the liquid contained in the battery, and which can readily be disassembled to permit renewal of the packing without damage to or destruction of any of the parts.

I will describe one form of terminal structure embodying my invention, and will then point out the novel features thereof in claims.

The accompanying drawing is a view showing in vertical section one form of terminal structure embodying my invention.

Referring to the drawing, the reference character 1 designates the top plate or cover of a battery cell. This cover contains a hole 2 the upper portion of which is provided with screw threads 3. Projecting through the hole 2 is a terminal post 4 the lower end of which is attached in suitable manner to one of the sets of battery plates 5.

Surrounding the post 4 is a sleeve-like gasket 6 of suitable material such as soft rubber, the inner surface of which is cylindrical to fit closely against the post, and the outer surface of which is conical with the smaller diameter at the top. It will be noted that the conical wall of this gasket forms a very acute angle with the vertical, that is, with the longitudinal axis of the post 4. This gasket rests against shoulder $4^a$ on the terminal post 4.

The reference character 7 designates a follower which, as here shown, is in the form of a nut having a body portion $7^a$ and a head portion $7^b$. The body portion is threaded to coöperate with the screw threads 3 in the cover 1, and is recessed to receive the gasket 6, and the inner surface of this portion of the nut is conical with the smaller diameter at the top. This conical inner surface forms the same angle with the vertical as the conical outer surface of the gasket 6, so that as the nut is screwed down into the cover 1 it presses evenly at all points on the gasket and so tends to force the gasket into engagement with the post 4. The head portion $7^b$ of the nut is sleeved on the post 4, and is of such size that it overlaps part of the cover 1. Located between this head portion $7^b$ and the cover 1, is a ring-like gasket 8 of suitable material such as soft rubber.

Owing to the structure just described, I am able to make the gasket 6 substantially as long as the thickness of cover 1, so that the sealing effect of this gasket is maximum.

To assemble the structure, the gasket 6 is placed on the post 4, and gasket 8 is placed on the cover 1, whereupon the nut 7 is screwed into the cover until it compresses both gaskets with as much force as may be desired. It will be observed that, owing to the acute angle between the conical wall of gasket 6 and the line of longitudinal movement of the nut, a given amount of compression of the gasket requires a considerable movement of the nut, and so it follows that the compression can be closely adjusted and a very heavy compression can be attained, if desired, by a comparatively small amount of torque on the nut.

It will be observed that the leakage of liquid between the post 4 and the nut 7 is prevented by gasket 6, and that leakage between the nut 7 and the cover 1 is prevented by gasket 8. These being the only two paths by which the battery liquid might escape through the terminal structure, it follows that leakage is prevented in so far as this structure is concerned.

One important feature of my invention is the fact that the gaskets can be renewed without destroying or damaging any other part of the structure. To do this it is only necessary to withdraw nut 7, replace the gaskets, and return the nut to its place.

Although I have herein shown and described only one form of terminal structure embodying my invention, it is understood that various changes and modifications may be made therein within the scope of the appended claims without departing from the spirit and scope of my invention.

Having thus described my invention, what I claim is:

1. In an electric battery, a cell cover having a hole, a terminal post projecting through said hole, a gasket sleeved on said post and having a conical outer surface, and a nut adapted to screw into said hole and having a conical inner surface coöperating with the conical surface of said gasket.

2. In an electric battery, a cell cover having a hole, a terminal post projecting through said hole and provided with a shoulder, a gasket sleeved on said post and abutting against the shoulder on the post, the outer surface of said gasket being conical, and a nut adapted to screw into said hole and having a conical inner surface coöperating with the outer surface of said gasket.

3. In an electric battery, a cell cover having a hole, a terminal post projecting through said hole, a gasket surrounding said post and having a conical outer surface, a nut adapted to screw into said hole and having a conical inner surface coöperating with the conical surface of said gasket, said nut having a head overlapping part of said cell cover, and a second gasket located between said cell cover and the head of said nut.

4. In an electric battery, a cell cover having a hole, a terminal post projecting through said hole, a gasket sleeved on said post and having a conical outer surface, and a follower adapted to be driven into said hole and having a conical inner surface coöperating with the conical surface of said gasket.

5. In an electric battery, a cell cover having a hole, a terminal post projecting through said hole, a gasket sleeved on said post and having a conical outer surface forming an acute angle with the vertical, and a follower adapted to be driven into said hole and having a conical inner surface coöperating with the conical surface of said gasket.

6. In an electric battery, a cell cover having a hole, a terminal post projecting through said hole, a gasket sleeved on said post and having a conical outer surface forming an acute angle with the vertical, and a nut screwing into said hole and having a conical inner surface coöperating with the conical surface of said gasket.

7. In an electric battery, a cell cover having a hole, a terminal post projecting into said hole and provided with a shoulder, a gasket sleeved on said post and abutting against said shoulder, the outer surface of said gasket being conical, and a follower adapted to be driven into said hole and having a conical inner surface coöperating with the conical surface of said gasket.

8. In an electric battery, a cell cover provided with a hole, a terminal post projecting through said hole, a gasket sleeved on said post and having a conical outer surface; a nut having a head portion sleeved on said post and overlapping part of the cell cover, a body portion recessed to receive said gasket and having a conical inner surface coöperating with the conical surface of said gasket; and a second gasket located between said cell cover and the head portion of said nut.

9. In an electric battery, a cell cover provided with a hole, a terminal post projecting through said hole and provided with a shoulder, a gasket sleeved on the post and abutting against said shoulder, the outer surface of said gasket being conical; a nut having a head portion sleeved on said post and overlapping part of the cell cover, and a body portion recessed to receive said gasket and having a conical inner surface coöperating with the conical surface of said gasket; and a second gasket located between said cell cover and the head portion of said nut.

In testimony whereof I affix my signature.

PAUL E. NORRIS.